US012548286B2

(12) United States Patent
Matsunaga

(10) Patent No.: US 12,548,286 B2
(45) Date of Patent: Feb. 10, 2026

(54) FEATURE AMOUNT ACQUISITION DEVICE, SIMILAR IMAGE SEARCH DEVICE, DISPLAY DEVICE, FEATURE AMOUNT ACQUISITION METHOD, SIMILAR IMAGE SEARCH METHOD, DISPLAY METHOD, AND PROGRAM

(71) Applicant: CASIO COMPUTER CO., LTD., Tokyo (JP)

(72) Inventor: Kazuhisa Matsunaga, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 263 days.

(21) Appl. No.: 18/021,962

(22) PCT Filed: May 26, 2021

(86) PCT No.: PCT/JP2021/019924
§ 371 (c)(1),
(2) Date: Feb. 17, 2023

(87) PCT Pub. No.: WO2022/038855
PCT Pub. Date: Feb. 24, 2022

(65) Prior Publication Data
US 2023/0394783 A1 Dec. 7, 2023

(30) Foreign Application Priority Data
Aug. 17, 2020 (JP) .................................. 2020-137310

(51) Int. Cl.
*G06V 10/764* (2022.01)
*G06T 7/00* (2017.01)
(Continued)

(52) U.S. Cl.
CPC ............ *G06V 10/44* (2022.01); *G06T 7/0012* (2013.01); *G06V 10/761* (2022.01);
(Continued)

(58) Field of Classification Search
None
See application file for complete search history.

(56) References Cited

U.S. PATENT DOCUMENTS 10,223,611 B1 * 3/2019 Price ...................... G06F 18/24
11,423,548 B2 * 8/2022 Grauman .................. G06T 7/11
(Continued)

FOREIGN PATENT DOCUMENTS

JP 2016162414 A 9/2016
JP 2020008896 A 1/2020
(Continued)

OTHER PUBLICATIONS

Ge, Z. et al., "Skin Disease Recognition Using Deep Saliency Features and Multimodal Learning of Dermoscopy and Clinical Images", Sep. 4, 2017, pp. 250-258.
(Continued)

*Primary Examiner* — Tsung Yin Tsai
(74) *Attorney, Agent, or Firm* — Scully, Scott, Murphy & Presser, P.C.

(57) ABSTRACT

A feature amount acquisition device (100) includes an activation level calculator (12) deriving, as an activation level, a level at which, in a CNN classifier (11) including a plurality of layers and configured to, by processing input data based on image data of an input image capturing a first target and a second target around the first target in the layers, output a classification result of the first target, an unit in a layer among the layers influences a classification result and a feature amount acquirer (14) acquiring, based on the derived activation level and the image data of the input image, a feature amount of the input image so that a feature amount of a low activation level image region that is a region in the input image corresponding to a second unit having a lower activation level than a first unit is smaller than a feature amount of a high activation level image region
(Continued)

that is a region in the input image corresponding to the first unit.

17 Claims, 8 Drawing Sheets

(51) Int. Cl.
*G06V 10/44* (2022.01)
*G06V 10/74* (2022.01)
*G06V 40/10* (2022.01)

(52) U.S. Cl.
CPC .......... *G06V 10/764* (2022.01); *G06V 40/107* (2022.01); *G06T 2207/30024* (2013.01)

(56) References Cited

U.S. PATENT DOCUMENTS

| | | | |
|---|---|---|---|
| 11,948,687 B2* | 4/2024 | Jaber | G06N 3/0464 |
| 2018/0144209 A1* | 5/2018 | Kim | G06N 3/04 |
| 2019/0087687 A1* | 3/2019 | Danielsson | G06F 16/56 |
| 2019/0122112 A1 | 4/2019 | Stone et al. | |
| 2019/0279033 A1* | 9/2019 | Price | G06V 10/82 |
| 2019/0355128 A1* | 11/2019 | Grauman | G06T 7/215 |
| 2020/0134820 A1* | 4/2020 | Hendriks | G06T 7/0012 |
| 2021/0035304 A1* | 2/2021 | Jie | G06N 3/084 |
| 2022/0375102 A1* | 11/2022 | Grauman | G06N 3/045 |
| 2022/0375602 A1* | 11/2022 | Jaber | G16H 30/40 |
| 2023/0016320 A1* | 1/2023 | Ono | G06T 7/0012 |

FOREIGN PATENT DOCUMENTS

| | | |
|---|---|---|
| JP | 2020101927 A | 7/2020 |
| WO | 2019231102 A1 | 12/2019 |

OTHER PUBLICATIONS

Extended European Search Report dated Jan. 15, 2024 received in European Patent Application No. EP 21858006.6.
International Search Report dated Aug. 24, 2021 issued in PCT/JP2021/019924.
Office Action dated Nov. 12, 2025 received in European patent Application No. 21858006.6.
Jimenez, A. et al., "Class-Weighted Convolutional Features for Visual Instance Search", British Machine Vision Conference, 2017, pp. 1-13.

* cited by examiner

ACTIVATION MAP OF CLASS i

FEATURE AMOUNT ACQUISITION DEVICE, SIMILAR IMAGE SEARCH DEVICE, DISPLAY DEVICE, FEATURE AMOUNT ACQUISITION METHOD, SIMILAR IMAGE SEARCH METHOD, DISPLAY METHOD, AND PROGRAM

TECHNICAL FIELD

The present disclosure relates to a feature amount acquisition device, a similar image search device, a display device, a feature amount acquisition method, a similar image search method, a display method, and a program.

BACKGROUND ART

Technologies for improving search precision in image search by subjecting a region other than a search target, such as a background, to masking processing have been developed. For example, in Patent Literature 1, in the case of searching image data for a person, a search query is generated by removing background noise in the image except a region of the person through masking processing. In addition, image search is performed in an image database, using the generated search query, and a search result is output.

In the prior art, identification of a region of a person is performed by a method in which a user identifies the region by a mouse while viewing an image, a method of, after displaying a region of a person in accordance with a predetermined person search algorithm, accepting a selection of the region of the person by a user, a method of detecting a person using a classifier trained through machine learning, or the like.

CITATION LIST

Patent Literature

Patent Literature 1: Unexamined Japanese Patent Application Publication No. 2016-162414

SUMMARY OF INVENTION

Technical Problem

In the prior art, since, as described above, image processing is performed in such a way as to faithfully mask a region other than a target object in an image, there is a problem in that a region that is useful for similar image search and a region that is not useful within the target object are not discriminated from each other, and, even when there is a region that is useful for the similar image search other than the target object in the image, such a region is also masked and the masking prevents a feature amount suitable for the similar image search from being acquired.

The present disclosure has been made in order to solve the above-described problem, and an objective of the present disclosure is to provide a feature amount acquisition device and the like that are capable of acquiring a feature amount suitable for similar image search.

Solution to Problem

In order to achieve the above-described objective, a feature amount acquisition device of the present disclosure includes:

activation level derivation means for deriving, as an activation level, a level at which, in a classifier including a plurality of layers and configured to, by processing input data based on image data of an input image in which a first target and a second target around the first target are captured in the plurality of layers, output a result of classifying the first target, an unit in a layer among the plurality of layers influences a classification result of the classifier; and feature amount acquisition means for acquiring, based on activation level derived by the activation level derivation means and the image data of the input image, a feature amount of the input image in such a way that a feature amount of a low activation level image region is smaller than a feature amount of a high activation level image region, the low activation level image region being a region in the input image corresponding to a second unit serving as the unit having the activation level lower than the activation level of a first unit serving as the unit, the high activation level image region being a region in the input image corresponding to the first unit.

Advantageous Effects of Invention

The present disclosure enables a feature amount suitable for similar image search to be acquired.

BRIEF DESCRIPTION OF DRAWINGS

FIG. 8 is a diagram describing a display example of images found in a search in the similar image search processing and the like.

DESCRIPTION OF EMBODIMENTS

Figure 1:
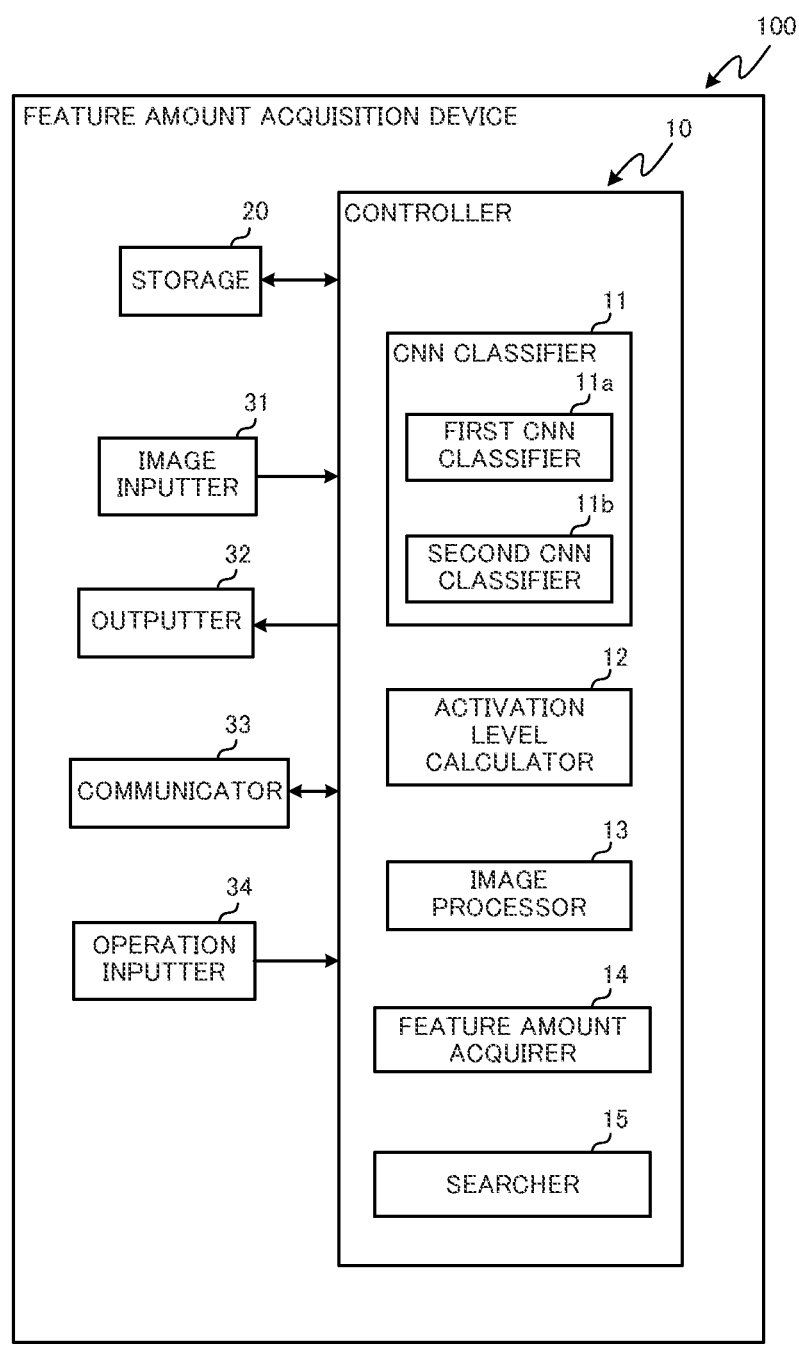
FIG. 1 is a diagram illustrating a functional configuration of a feature amount acquisition device according to Embodiment 1.

A feature amount acquisition device and the like according to an embodiment of the present disclosure are described below with reference to the drawings. Note that, in the drawings, the same or equivalent constituent elements are designated by the same reference numerals.

Embodiment 1

A feature amount acquisition device 100 according to Embodiment 1 includes a controller 10, a storage 20, an image inputter 31, an outputter 32, a communicator 33, and an operation inputter 34, as illustrated in FIG. 1. The feature amount acquisition device 100 is a device that searches for an image similar to an input image (a query image used as a key in the search) inputted from the image inputter 31. In addition, the feature amount acquisition device 100 is assumed to treat, for example, a dermoscopy image that is captured at the time of examination by a dermatologist. That is, an input image and a reference image, which is described later, are dermoscopy images, and it is assumed that, in such images, a first target (a diseased part or a part suspected to be diseased of skin) and a second target (skin around the first target) are captured. Hereinafter, a diseased part or a part suspected to be diseased of skin is collectively referred to as "observation target". In addition, the dermoscopy image is not limited to an image obtained by capturing the skin of a patient having skin disease, and examples of the dermoscopy image include a dermoscopy image obtained by capturing the skin of a healthy person. Hereinafter, persons whose dermoscopy images are captured are collectively referred to as "observation subjects".

The controller 10 includes a central processing unit (CPU) and the like and achieves functions of respective units (a CNN classifier 11, an activation level calculator 12, an image processor 13, a feature amount acquirer 14, and a searcher 15), which are described later, by executing programs stored in the storage 20.

The storage 20 includes a read only memory (ROM), a random access memory (RAM), and the like and stores programs that the CPU of the controller 10 executes and data required for the CPU to execute the programs. The storage 20 also stores image data of an image used for training of the CNN classifier 11 (image for training) and image data of an image to be searched in an image search (image for search).

Note that the feature amount acquisition device 100 may use the same image as both an image for training and an image for search and, hereinafter, an image for training and an image for search are collectively referred to as reference images. The feature amount acquisition device 100 may also expand the reference images by acquiring a portion or all of a reference image from the image inputter 31 or the communicator 33 and storing the acquired image in the storage 20.

The image inputter 31 is a device to input image data of an input image. For example, the image inputter 31 includes an imaging element, such as a complementary metal oxide semiconductor (CMOS) image sensor, and the controller 10 acquires image data of an input image via the image inputter 31.

Note, however, that the image inputter 31 is not limited to an imaging element and an arbitrary device may be used as the image inputter 31 as long as the controller 10 can acquire image data of an input image. For example, when image data of an input image is stored in the storage 20 in advance and the controller 10 acquires the image data of the input image by reading the image data from the storage 20, the storage 20 also serves as the image inputter 31. In addition, when the controller 10 acquires image data of an input image from an external server or the like via the communicator 33, the communicator 33 also serves as the image inputter 31. In addition, as described afore, the image inputter 31 may be used as a device to store image data of a reference image in the storage 20.

The outputter 32 is a device for the controller 10 to output an input image inputted from the image inputter 31, a similar image found in a search based on an input image, an activation map generated at the time of searching for a similar image, or the like. For example, the outputter 32 is a liquid crystal display or an organic electro-luminescence (EL) display. In this case, the outputter 32 functions as display means, and the feature amount acquisition device 100 serves as a display device. Note, however, that the feature amount acquisition device 100 may include a display as described above as the outputter 32 or may include the outputter 32 as an interface to connect an external display. When the feature amount acquisition device 100 includes the outputter 32 as an interface, the feature amount acquisition device 100 displays a similar image search result or the like on an external display connected via the outputter 32.

The communicator 33 is a device (a network interface or the like) to perform transmission and reception of data with another external device (such as a server in which a database of image data is stored). The controller 10 is capable of acquiring image data via the communicator 33.

The operation inputter 34 is a device to accept an operation inputted to the feature amount acquisition device 100 from a user and is, for example, a keyboard, a mouse, a touch panel, or the like. The feature amount acquisition device 100 accepts an instruction or the like from the user via the operation inputter 34. The operation inputter 34 functions as operation input means.

Next, functions of the controller 10 are described. The controller 10 achieves functions of the CNN classifier 11, the activation level calculator 12, the image processor 13, the feature amount acquirer 14, and the searcher 15.

The CNN classifier 11 is a classifier of an image based on a convolutional neural network (CNN). The controller 10 executing a program achieving a classifier based on the CNN causes the controller 10 to function as the CNN classifier 11. The CNN classifier 11 includes an input layer to which image data (input image) are inputted as input data, an output layer from which a classification result is outputted, and an intermediate layer between the input layer and the output layer and outputs a result of classification of a classification target captured in an input image from the output layer. A more detailed structure of the CNN is described later.

In addition, in Embodiment 1, there exist, as the CNN classifier 11, a first CNN classifier 11a that classifies whether skin captured in an input image is the palms and soles (the palm of the hand or the sole of the foot) or the non-palms and soles (the skin of a region that is neither the palm of the hand nor the sole of the foot) and a second CNN classifier 11b that classifies whether an observation target captured in an input image is benign or malignant. The first CNN classifier 11a functions as determination means for determining whether or not skin around an observation target captured in an input image is the palms and soles (specific target). Note, however, that the first CNN classifier 11a and the second CNN classifier 11b may be achieved by using a single CNN classifier 11 differently by replacing weighting parameters of respective layers and the like inside the CNN.

The activation level calculator 12, by generating an activation map, calculates activation levels of respective units in the activation map and respective pixels in an input image. The activation map is a map that visualizes, as activation levels, levels at which respective units in an intermediate layer influence a classification result by the CNN classifier 11, based on values of the respective units in the intermediate layer, weighting parameters, and the like of the CNN classifier 11, and details of the activation map is described later. The activation level calculator 12 is capable of identifying, based on an activation map calculated from an input image, a region in the input image that corresponds to units having low activation levels in the activation map (a low activation level image region, which is described later) and a region in the input image that corresponds to units having high activation levels in the activation map (a high activation level image region, which is described later) by establishing positional relationships between respective units in the activation map and respective pixels in the input image. The activation level calculator 12 functions as activation level derivation means.

The image processor 13 acquires image data of a post-processing image by subjecting image data of an input image to image processing based on activation levels calculated by the activation level calculator 12 in such a way that a feature amount of a low activation level image region that is a region in the input image corresponding to second units having lower activation levels than first units is smaller than a feature amount of a high activation level image region that is a region in the input image corresponding to the first units. Basically, the image processor 13 performs image processing to set a weight of each pixel in the input image in such a manner that the higher the activation level of the pixel is, the more the weight of the pixel is greater than a weight of a corresponding pixel for masking processing and calculate a weighted average of the values of both pixels. Specifically, the image processor 13 determines a value of the activation level of each pixel in the image data of the input image as a weight of the pixel value (an input pixel weight), determines a value obtained by subtracting the input pixel weight from 1 as a weight of a corresponding pixel value for the masking processing (a masking weight), and subjects the input image to image processing to calculate a weighted average of each pixel value in the image data of the input image and a corresponding pixel value for the masking processing, based on the input pixel weight and the masking weight. That is, the image processor 13 performs image processing of alpha blending, using the value of the activation level of the pixel as an α value in the alpha blending. The image processor 13 functions as image processing means.

More specifically, when the values of RGB (red, green, blue) of each pixel in an input image are denoted as (pR, pG, pB), the activation level of the pixel is denoted as α (α is an arbitrary value of 0.0 or more and 1.0 or less), the values of RGB of a specific color for the masking processing are denoted as (sR, sG, sB), and the values of RGB of the pixel after the masking processing are denoted as (mR, mG, mB), the image processor 13 acquires a post-processing image by subjecting the input image to, for example, image processing expressed by the formula (1) below with respect to each pixel in the input image. That is, the image processor 13 performs masking processing by the alpha blending, using the activation level of a pixel as an α value in the alpha blending. Note, however, that the specific color for the masking processing is the color of a pixel value representing a second target and is, for example, the color of skin. In addition, in this processing, the α value in the alpha blending is transparency information that is set with respect to each pixel in the input image, and the smaller the value is, the higher the transparency of the input image in the alpha blending becomes. That is, as is evident from the formula (1), by calculating a weighted average of the values of RGB of each pixel in the input image and the values of RGB of the specific color for the masking processing, using the activation level as a weighting coefficient, a post-masking processing image (also simply referred to as "post-processing image") is generated.

$$(mR, mG, mB) = \alpha \cdot (pR, pG, pB) + (1-\alpha) \cdot (sR, sG, sB) \quad (1)$$

The feature amount acquirer 14 acquires a feature amount of a post-masking processing image, based on the image data of the post-masking processing image acquired by the image processor 13. Specifically, the feature amount acquirer 14 acquires a k-dimensional feature vector as a feature amount of the post-masking processing image by a bag of visual words (BoVW). Herein, k is the number of visual words used in the BoVW. Note that the feature amount acquirer 14 may, after acquiring a k-dimensional feature vector by the BoVW, reduce the number of dimensions of the feature vector by principal component analysis (PCA) or the like. The feature amount acquirer 14 functions as feature amount acquisition means.

For example, the feature amount acquirer 14 acquires k visual words by categorizing all local feature amounts acquired from all the reference images into k clusters by the k-means method. The feature amount acquirer 14 causes each of all local feature amounts acquired from a provided image to vote for one of the k visual words. Through this processing, the feature amount acquirer 14 can acquire a feature vector of the provided image as a histogram of the k visual words. Note that the above-described local feature amounts are acquired by, for example, scale-invariant feature transform (SIFT), speed-upped robust feature (SURF), or the like.

The searcher 15 searches a plurality of reference images for a similar image similar to an input image, based on the feature amount of a post-masking processing image acquired by the feature amount acquirer 14. Details of similar image search processing in which the searcher 15 searches for a similar image is described later. The searcher 15 functions as search means.

The functional configuration of the feature amount acquisition device 100 was described above. Next, an outline of a CNN is described. The CNN, differing from a general forward propagation type neural network, includes a convolutional layer and a pooling layer as intermediate layers in addition to fully-connected layers, and a feature of an input image is extracted by the intermediate layers. At the output layer, a result of classification of a classification target in the input image is stochastically represented. A typical structure and an outline of typical processing of the CNN that identifies which one of N classes a classification target belongs to (performs N-class classification) are described with reference to FIG. 2.

Figure 2:
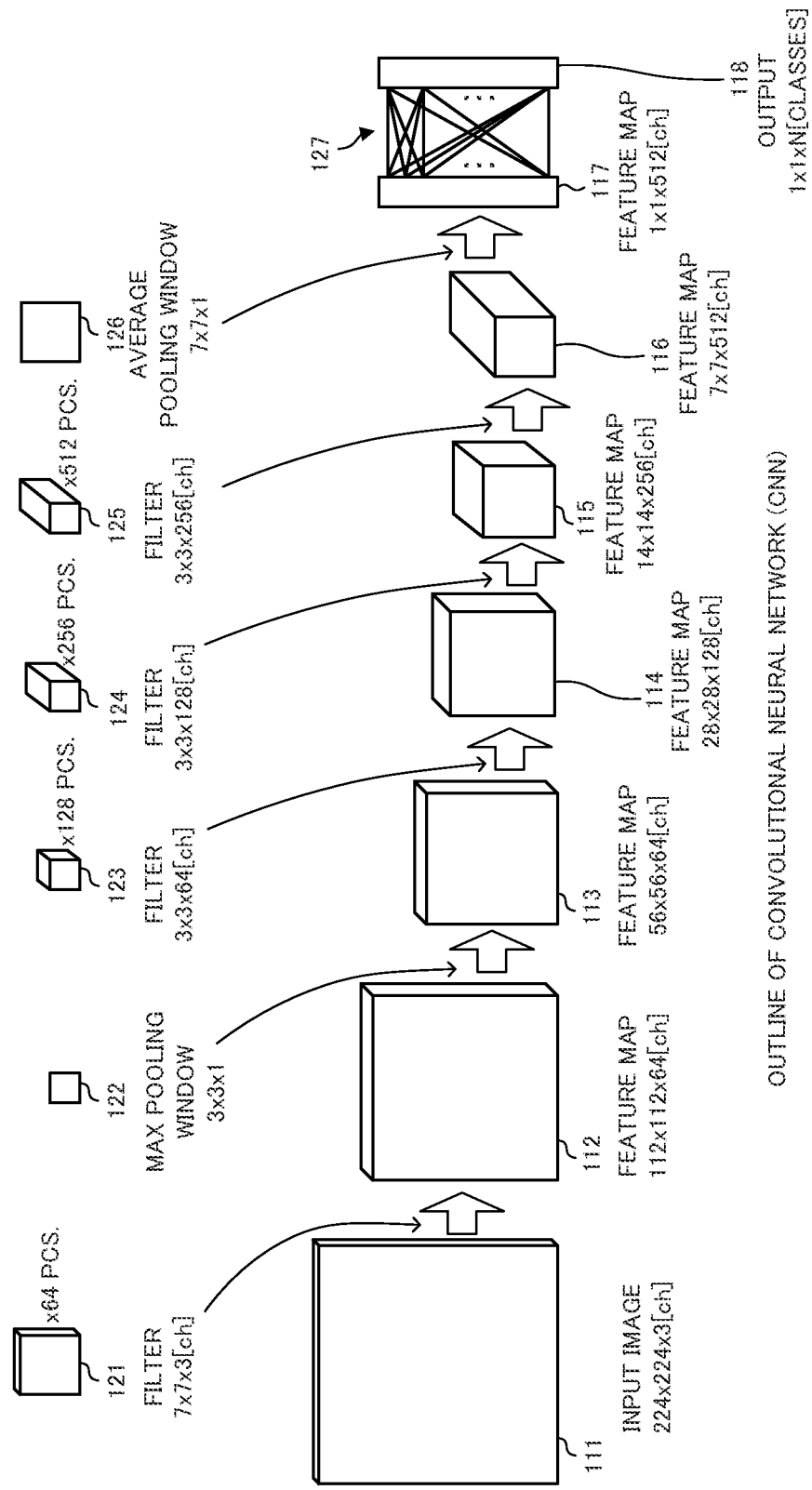
FIG. 2 is a diagram describing an outline of a convolutional neural network.

As illustrated in FIG. 2, the processing of N-class classification by the CNN is processing in which feature maps having gradually diminishing sizes are calculated by subjecting an input image 111 to convolution processing (scanning by filters) and pooling processing (scanning by a window) and an output 118 is finally acquired. A layer in which the input image 111 is stored and a layer in which the output 118 is stored are also referred to as an input layer and an output layer, respectively. In the example illustrated in FIG. 2, by scanning the inputted input image 111 by filters 121, 123, 124, and 125 for the convolution processing and windows 122 and 126 for the pooling processing, feature maps having gradually diminishing sizes (having the smaller number of units in the vertical and horizontal directions) are calculated. In addition, by gradually increasing the numbers of elements in the filters 121, 123, 124, and 125 for the convolution processing, feature maps for 512 channels are calculated in a feature map 116. The feature map 116 is further subjected to global average pooling processing to output an average value within the feature map of each channel and is thereby converted to a 1×1×512-dimensional feature map 117.

The final layer (feature map 117) among the intermediate layers of the CNN and the output layer (output 118) are connected to each other by a fully-connected connection 127, and, as with a general neural network, weighted addition and softmax processing are performed. The final layer among the intermediate layers of the CNN is also referred to as a fully-connected layer because the final layer is connected to the output layer by the fully-connected connection 127. Since, in this example, the N-class classification is performed, the output 118 has N values, and each value of the N values represents a probability of a corresponding class.

The outline of typical processing of the N-class classification performed by the CNN was described above. Recent years, methods for generating an activation map, based on respective feature maps existing in an intermediate layer of a CNN have been proposed. The activation map is, as described above, a map that visualizes, as activation levels, levels at which respective units in the intermediate layer influence a classification result, based on the values of the respective units in the intermediate layer, weighting parameters, and the like of the CNN. Herein, class activation mapping (CAM) is described as an example of an activation map generation method.

Figure 3:
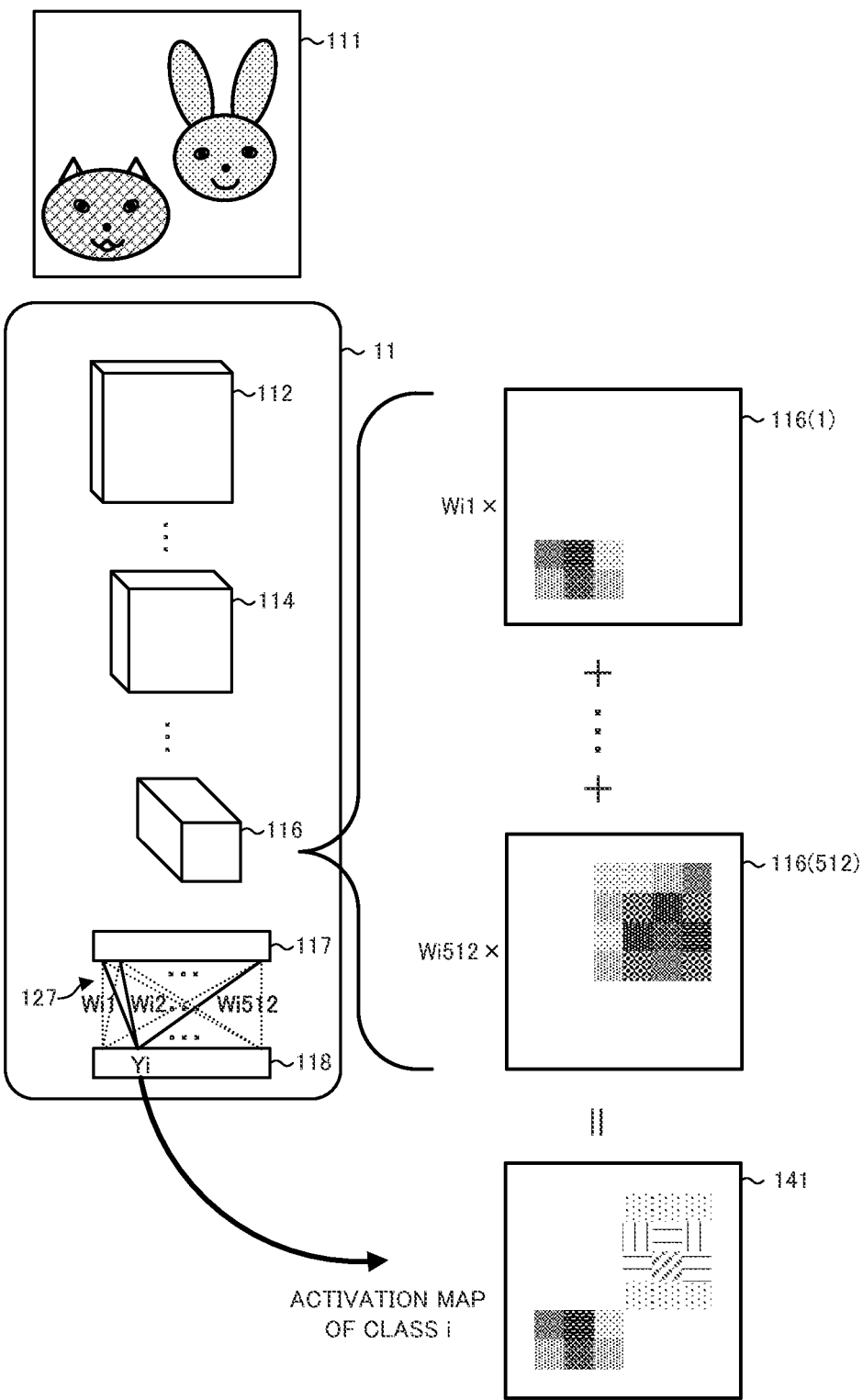
FIG. 3 is a diagram describing an outline of a method for generating an activation map.

The CAM is a method for generating an activation map of a class i among the N classes by weighting each channel (channel j) of 512 channels in the feature map 116, which is an intermediate layer closest to the fully-connected layer, by a weighting coefficient (Wij) and adding the weighted values, as illustrated in FIG. 3. As used herein, the weighting coefficient is a weighting coefficient (Wij) of the fully-connected connection 127 used at the time of calculating an output (Yi) of a class i that is a target class of activation map generation. Through this processing, it is possible to generate, with respect to each class, an activation map of the class. FIG. 3 illustrates an example in which, when an input image 111 in which a cat and a rabbit are captured is inputted to the CNN classifier 11, the feature map 116 of size 7×7, which is smaller than the size of the input image, is visualized with a class i corresponding to the cat set as a target class of the activation map generation.

In FIG. 3, by multiplying the j-th channel (j denotes a channel number) of the feature map 116 by a weighting coefficient Wij for obtaining an output of the class i in the fully-connected connection 127 and adding the multiplication results for 512 channels, an activation map 141 of the class i is generated. In FIG. 3, a feature map 116(1) and a feature map 116(512) indicate the first channel and the 512-th channel of the feature map 116, respectively. The value (activation level) of each unit in the feature map 116 and the activation map 141 is normalized in such a way that the value is greater than or equal to 0.0 and less than or equal to 1.0, and, in FIG. 3, when the value of the activation level is 0.0, 1.0 and greater than 0.0 and less than 1.0, the unit is illustrated in white, in black, and in such a manner that the larger the value is, the darker does hatching become, respectively.

In the example illustrated in FIG. 3, as the value (darkness of hatching) of each unit in each channel of the feature map 116 indicates, the activation levels of units corresponding to the position of the face of the cat become higher in the first channel of the feature map 116, and the activation levels of units corresponding to the position of the face of the rabbit become higher in the 512-th channel of the feature map 116. Since the magnitude of a weight Wi1 corresponding to the first channel (where the activation levels of units corresponding to the position of the face of the cat become higher) at the time of calculating a probability Yi of the class i corresponding to the cat is larger than the magnitude of a weight Wi512 corresponding to the 512-th channel (where the activation levels of units corresponding to the position of the face of the rabbit become higher), in the activation map 141 of the class i (corresponding to the cat), the activation levels of a portion corresponding to a region in which the face of the cat exists in the input image are higher and the activation levels of a portion corresponding to the other region in the input image are lower. Note that the activation level having a higher value in an activation map is referred to as being high active and the activation level having a lower value is referred to as being low active. A region that is high active and a region that is low active are referred to as a high active region and a low active region, respectively.

In addition, the size of the activation map 141 is the same as the size of the feature map 116 (in this example, 7×7 because each of the numbers of units in the vertical and horizontal directions is 7), and is generally smaller than the size of the input image 111 (in this example, the number of pixels is 224×224). However, the activation map 141 can be interpolated by bilinear interpolation or the like in such a way as to have the same size as the size of the input image 111. In the present embodiment, as described later, the activation level calculator 12, after interpolating the activation map 141 in such a way that the activation map 141 has the same size as the size of the input image 111, overlays the respective units in the activation map 141 on the respective pixels in the input image 111 and associates the units with the pixels on a one-to-one basis, and the image processor 13 performs, according to the activation level of each unit in the activation map 141, masking processing on a corresponding pixel in the input image 111.

Figure 4:
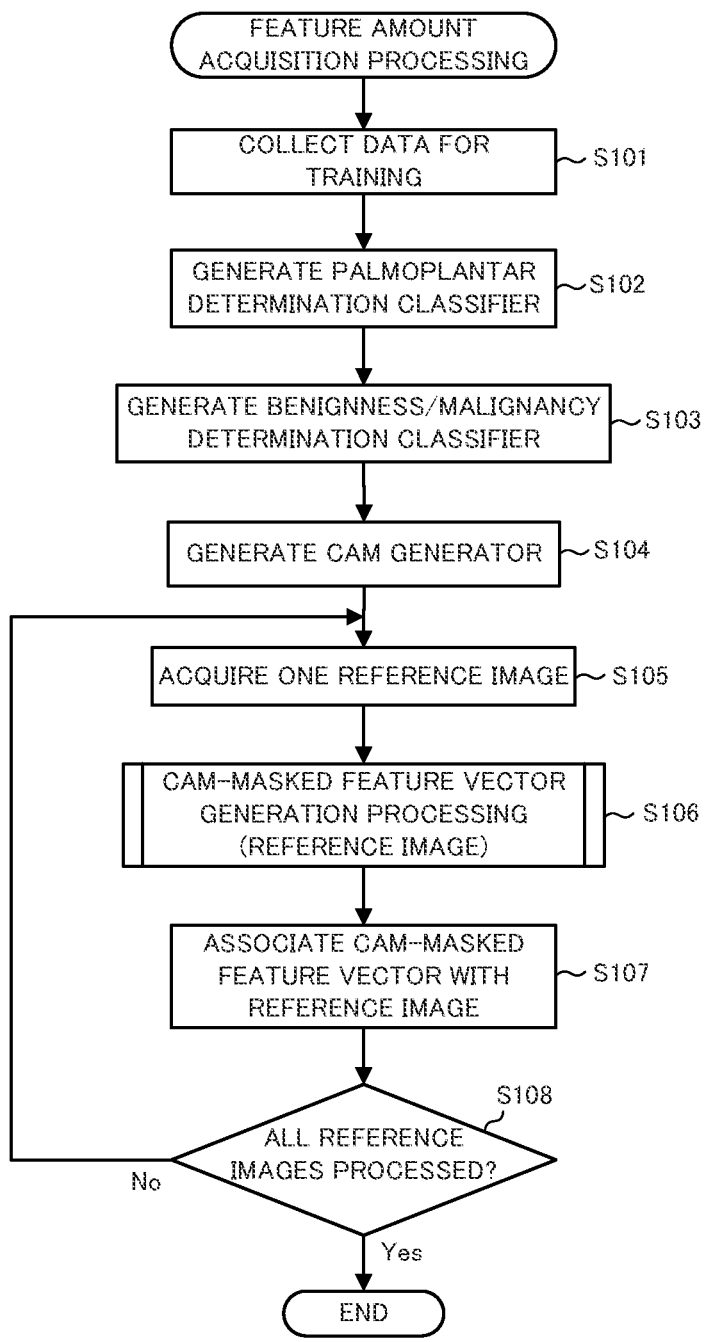
FIG. 4 is a flowchart of feature amount acquisition processing according to Embodiment 1.

Next, feature amount acquisition processing that the feature amount acquisition device 100 performs is described below with reference to FIG. 4. The feature amount acquisition processing is started when the feature amount acquisition device 100 is instructed to start the feature amount acquisition processing by the user via the operation inputter 34. Note that the feature amount acquisition processing is required to be finished before execution of the similar image search processing, which is described later. Feature amounts of the respective reference images are acquired through the feature amount acquisition processing, and a database (DB) for search that is to be used in the similar image search processing is constructed.

First, the user collects data for training and stores collected data in the storage 20 (step S101). Specifically, the user collects reference images (images for training and images for search) provided with teacher labels. In the present embodiment, it is assumed that, as the teacher labels, three types of labels, namely a benignness/malignancy label indicating whether an observation target captured in the image is benign or malignant, a palmoplantar label indicating whether skin around an observation target captured in the image is the palms and soles or the non-palms and soles, and a race label indicating a race of an observation subject captured in the image, are provided to each reference image. Note that it may be configured such that, after the user collects reference images without teacher labels, the user, a doctor, an expert, or the like provides each reference image with teacher labels as described above. In addition, step S101 may be performed before the start of training processing and collected information may be stored in the storage 20 in advance, and, in this case, step S101 can be omitted.

Next, the controller 10 repeats processing of training the first CNN classifier 11a, using a reference image stored in the storage 20 and a palmoplantar label provided to the reference image and thereby generates a palmoplantar determination classifier that performs 2-class classification to classify whether skin around an observation target captured in a reference image is the palms and soles or the non-palms and soles (step S102).

Next, the controller 10 repeats processing of training the second CNN classifier 11b, using a reference image stored in the storage 20 and a benignness/malignancy label provided to the reference image and thereby generates a benignness/malignancy determination classifier that performs 2-class classification to classify whether an observation target captured in the reference image is benign or malignant (step S103).

Next, the controller 10 generates a CAM generator that generates a CAM described afore from the second CNN classifier 11b (benignness/malignancy determination classifier) (step S104). Specifically, the controller 10 generates a CAM generator that, when an input image is provided, generates an activation map of a benign class and an activation map of a malignant class through a process as illustrated in FIG. 3.

Next, the controller 10 acquires one reference image from the storage 20 (step S105) and performs CAM-masked feature vector generation processing, which is described later, on the acquired reference image (step S106).

Next, the controller 10 associates a CAM-masked feature vector generated in step S106 with the reference image as a vector for search of the reference image (step S107). Through this processing, the DB for search is constructed in the storage 20. Note that the DB for search may be constructed by dividing the DB for search into two DBs, namely a DB for palmoplantar search and a DB for non-palmoplantar search, based on the palmoplantar label provided to the reference image. In this case, a reference image in which skin around an observation target is the palms and soles and a vector for search thereof are registered in the DB for palmoplantar search, and a reference image in which skin around an observation target is the non-palms and soles and a vector for search thereof are registered in the DB for non-palmoplantar search.

Next, the controller 10 determines whether or not the CAM-masked feature vector generation processing has been performed on all reference images stored in the storage 20 (step S108). When there exists a reference image on which the CAM-masked feature vector generation processing has not been performed (step S108; No), the controller 10 returns to step S105 and acquires a next reference image. When the CAM-masked feature vector generation processing has been performed on all the reference images (step S108; Yes), the controller 10 terminates the feature amount acquisition processing.

Figure 5:
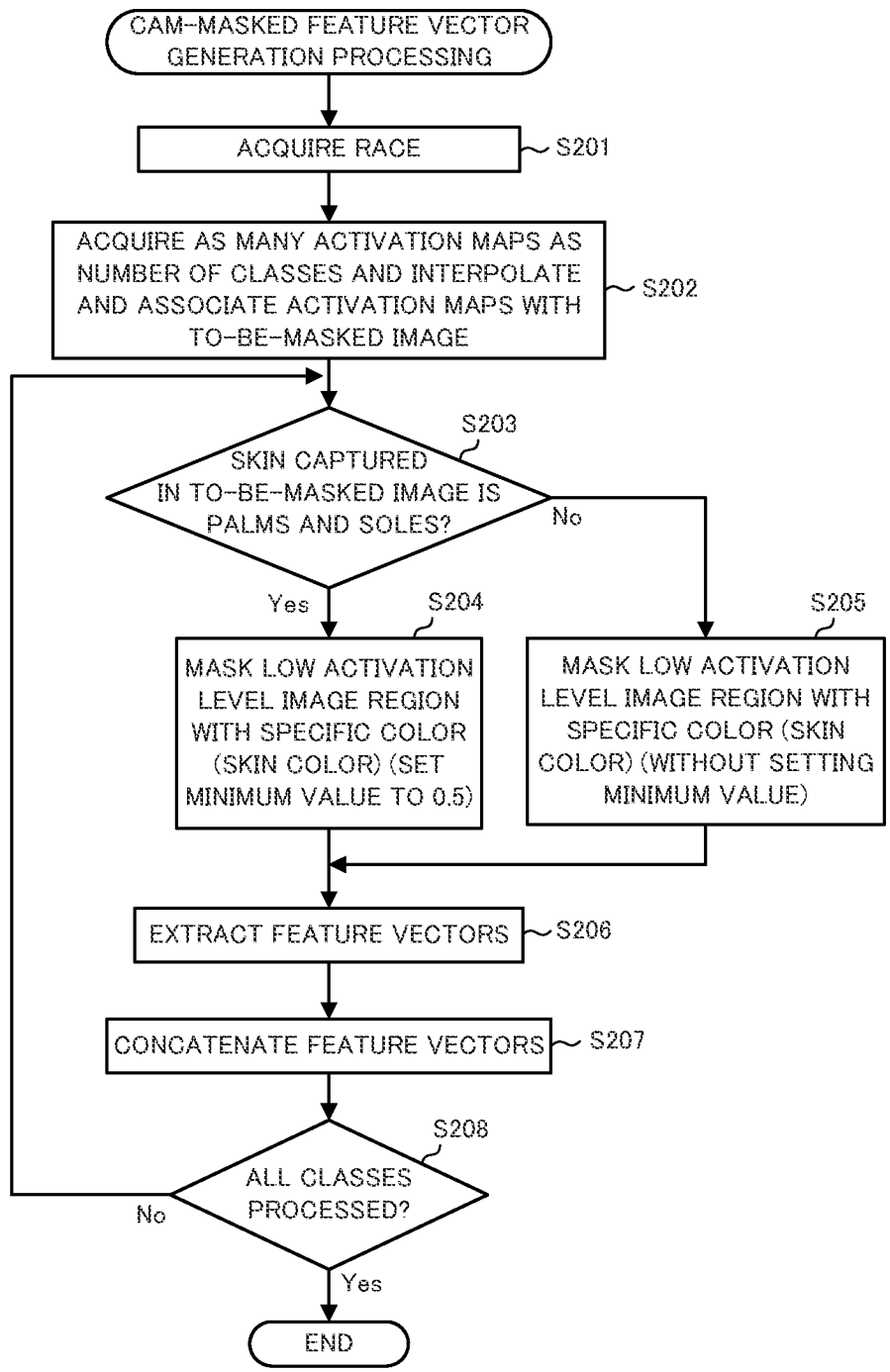
FIG. 5 is a flowchart of CAM-masked feature vector generation processing according to Embodiment 1.

Through the feature amount acquisition processing described above, the palmoplantar determination classifier, the benignness/malignancy determination classifier, the CAM generator, and the DB for search that are to be used at the time of performing similar image search are generated. Next, the CAM-masked feature vector generation processing that is executed in step S106 is described with reference to FIG. 5. The CAM-masked feature vector generation processing is processing in which, when an image (to-be-masked image) is provided, an image (post-masking processing image) obtained by subjecting the to-be-masked image to the masking processing using an activation map generated by the CAM is generated with respect to each class and, by combining, with respect to all classes, feature vectors each of which is extracted from a post-masking processing image of one of the classes, a final feature vector (CAM-masked feature vector) is generated.

First, the controller 10 acquires the race of a patient captured in the to-be-masked image (step S201). When the to-be-masked image is a reference image (an image for training or an image for search), the controller 10 acquires the race from the race label provided to the reference image. When no race label is provided to the to-be-masked image, the controller 10 acquires the race that is inputted by the user, a doctor, an expert, or the like via the operation inputter 34.

Figure 6:
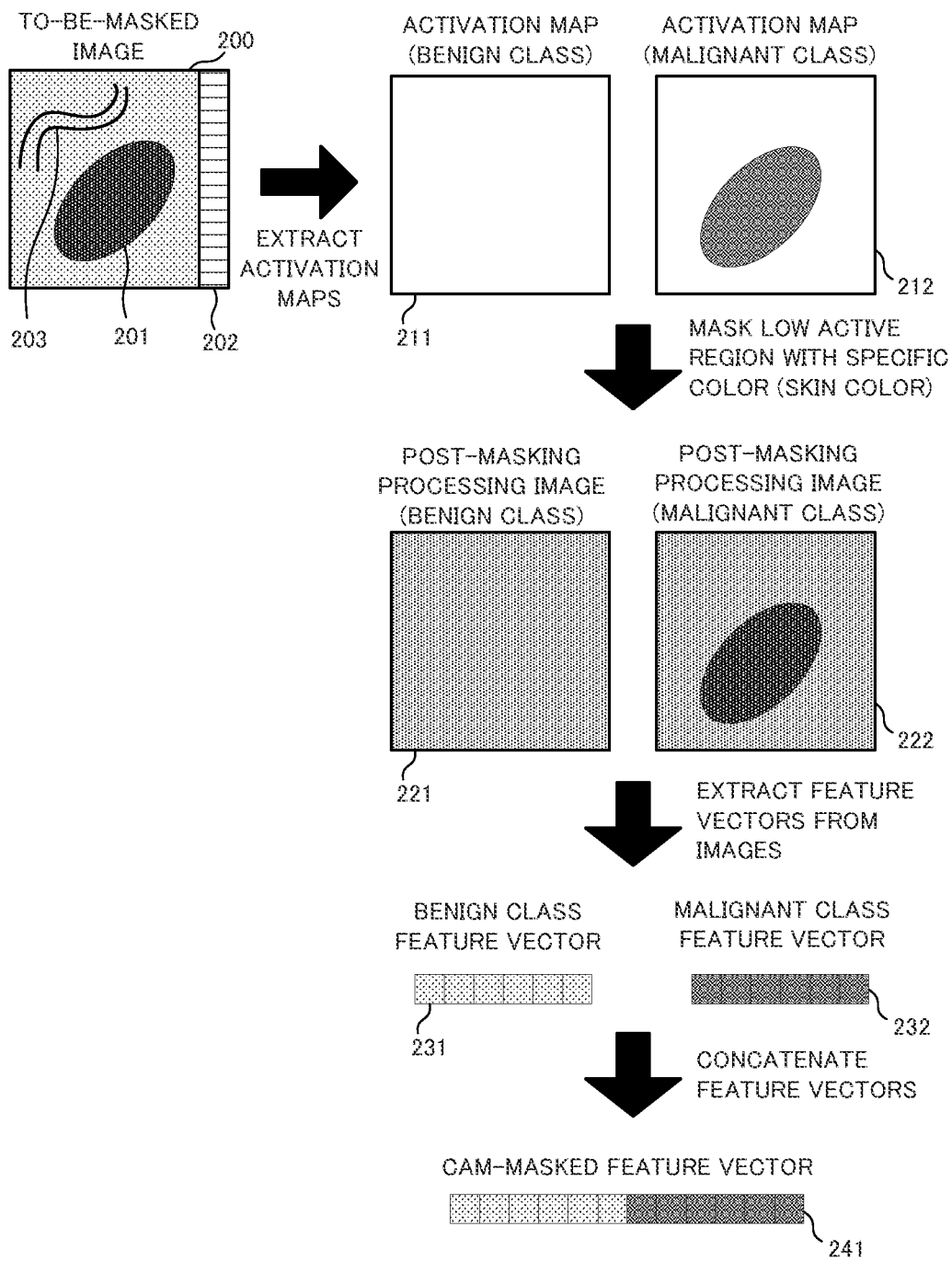
FIG. 6 is a diagram describing generation of a CAM-masked feature vector in the CAM-masked feature vector generation processing.

Next, the activation level calculator 12 acquires as many activation maps as the number of classes to be classified (in this example, the benign class and the malignant class) using the CAM generator generated in step S104 in the feature amount acquisition processing (FIG. 4), interpolates the activation maps in such a way that the size of the activation maps becomes the same as the size of the to-be-masked image, and associates the respective units in the activation maps with the respective pixels in the to-be-masked image on a one-to-one basis (step S202). As described above, the activation levels of the respective units in the activation maps are normalized in such a way that the activation levels have values in a range from 0.0 to 1.0, and, in each of the activation maps, a region in which the values of activation levels have larger values (high active region) and a region in which the values of activation levels have smaller values (low active region) are generated according to the activation levels of the respective units. For example, an example of a case where a malignant observation target 201, a scale 202, and hairs 203 are captured in a to-be-masked image 200 is illustrated in FIG. 6. In the example in FIG. 6, for facilitating understanding, it is assumed that the values of the activation levels of respective units in the activation maps corresponding to the positions of the scale 202 and the hairs 203 are 0.0 and the values of the activation levels of respective units corresponding to the position of the malignant observation target 201 in the activation map of the benign class are also 0.0. It is also assumed that the values of the activation levels of respective units corresponding to the position of the malignant observation target 201 in the activation map of the malignant class are 1.0 and are larger than activation levels (a value of 0.0) in the other region.

In this case, in the activation map of the benign class, the entire region of the activation map becomes a low active region in which the values of activation levels are 0.0. In the activation map of the malignant class, since the values of activation levels in a region corresponding to the malignant observation target 201 are larger than the values of activation levels in the other region, the region corresponding to the malignant observation target 201 becomes a high active region and the other region becomes a low active region. Since the respective activation maps are interpolated in such a way as to have the same size as that of the to-be-masked image 200, it is evident that, in an activation map 211 of the benign class, the entire region of the activation map becomes a low active region and, in an activation map 212 of the malignant class, the region corresponding to the malignant observation target 201 becomes a high active region and the other region becomes a low active region, as illustrated at the upper right in FIG. 6.

Since the activation maps 211 and 212 have been interpolated in such a way as to have the same size as that of the to-be-masked image 200, the respective units in the activation maps and the respective pixels in the to-be-masked image 200 correspond to each other on a one-to-one basis. A region in the to-be-masked image corresponding to a high active region in the activation map is a high activation level image region, and a region in the to-be-masked image corresponding to a low active region in the activation map is a low activation level image region.

Note that, although, in step S202, as many activation maps as the number of classification classes (in this example, the benign class and the malignant class) are acquired, in a loop from step S203 to step S208 (herein, referred to as a class-dependent loop), which is described below, the activation maps are processed one by one in order. For example, the activation map of the benign class is first processed, and, when the process returns from step S208 to step S203, the activation map of the malignant class is next processed.

In step S203, the controller 10 determines whether or not skin captured in the to-be-masked image is the palms and soles. In this determination, when the to-be-masked image is a reference image, the controller 10 determines whether or not the skin captured in the to-be-masked image is the palms and soles, based on the palmoplantar label provided to the reference image. When no palmoplantar label is provided to the to-be-masked image, the controller 10 determines whether or not the skin captured in the to-be-masked image is the palms and soles by inputting the to-be-masked image to the palmoplantar determination classifier generated in step S102 in the feature amount acquisition processing (FIG. 4).

When the skin captured in the to-be-masked image is the palms and soles (step S203; Yes), the image processor 13 subjects a region in the to-be-masked image (low activation level image region) corresponding to the low active region in the activation map acquired in step S202 to the masking processing, using a specific color (in this example, the color of skin) (step S204). Note, however, that, on this occasion, the image processor 13, by performing, as the masking processing, the alpha blending on the to-be-masked image and a skin-colored image for masking with respect to each pixel and setting the α value in the alpha blending in such a manner as to prevent the α value from becoming less than a minimum criterion value (for example, 0.5), prevents fingerprints and the like existing on palms and soles from being thoroughly masked. Specifically, in the above-described formula (1), when the value of the activation level is less than the criterion value, the values of RGB after the masking processing are calculated by setting the α value to the criterion value, and, when the value of the activation level is greater than or equal to the criterion value, the values of RGB after the masking processing are calculated using the above-described formula (1) as it is (that is, using the value of the activation level as the α value as it is).

When the skin captured in the to-be-masked image is not the palms and soles (step S203; No), the image processor 13 subjects a region in the to-be-masked image (low activation level image region) corresponding to the low active region in the activation map acquired in step S202 to the masking processing, using the above-described specific color (the color of skin) (step S205). In step S205, although the masking processing by the alpha blending is performed in a similar manner to the processing in step S204, the values of RGB after the masking processing are calculated using the above-described formula (1) as it is (that is, using the value of the activation level as the α value as it is) without setting the α value in the alpha blending in such a manner as to prevent the α value from becoming less than the criterion value.

In steps S204 and S205, the image processor 13 acquires a post-masking processing low activation level image region by subjecting the low activation level image region to the masking processing using the specific color (the color of skin). The image processor 13 sets the specific color used in the masking processing according to the race acquired in step S201. When the specific color represented by RGB values is denoted by (sR, sG, sB) (where each of sR, sG, and sB is assumed to be an 8-bit value), in the case where the race is, for example, the yellow race, the RGB values of the specific color (the color of the skin of the yellow race) are set within the following ranges.

$$150 < sG < 200$$

$$sR = k \times sG \text{ (where } 1.1 < k < 1.3)$$

$$sB = m \times sG \text{ (where } 0.8 < m < 1.2)$$

More in general, when it is assumed that the race is represented by a value in a range from 1 to 6 using a Fitzpatrick scale F, the RGB values (sR, sG, sB) of the specific color (the color of skin) are set within the following ranges. Note, however, that it is assumed that, in the following formula, ofset and r are set as ofset=100 and r=20 (applicable range per scale), respectively and each of sR, sG, and sB is an 8-bit value. In addition, the value of F is set to, for example, 1 in the case of the white race, 2 to 4 in the case of the yellow race, such as the Japanese, and 5 to 6 in the case of the black race.

$$(6-F) \times r + \text{ofset} \leq sG < (7-F) \times r + \text{ofset}$$

$$sR = k \times sG \text{ (where } 1.1 < k < 1.3)$$

$$sB = m \times sG \text{ (where } 0.8 < m < 1.2)$$

Note, however, that, in the case of a dermoscopy image, since the image is captured while white light is radiated and, as a result, the internal structure of the skin is also captured in the image, the color of the captured skin changes from a yellowish color to a pale reddish color. Therefore, in the above-described formula, the range of the blue component sB of the specific color is enlarged to a larger range (specifically, a range defined by m having a value of 1 or more).

An image obtained by the image processor 13 subjecting the to-be-masked image to the masking processing in step S204 or S205 is hereinafter referred to as a post-masking processing image. In the example illustrated in FIG. 6, skin captured in the to-be-masked image 200 is the non-palms and soles, and post-masking processing images 221 and 222 that the image processor 13 generated in step S205, based on activation levels calculated from the activation maps 211 and 212 illustrated at the upper right are illustrated in the right middle row. In this example, as illustrated in FIG. 6, since, in the benign class, the activation levels of all the elements in the activation map 211 have a value of 0 (α=0), that is, the entire activation map 211 is a low active region, (mR, mG, mB)=(sR, sG, sB) holds from the formula (1) and the post-masking processing image 221 in which the whole of the to-be-masked image is masked by the specific color is obtained. In the malignant class, since, in a region other than the region corresponding to the malignant observation target 201, the activation levels of the respective elements have a value of 0 (α=0), that is, the region is a low active region, the region other than the region corresponding to the malignant observation target 201 is similarly masked by the specific color and the post-masking processing image 222 in which the scale 202 and the hairs 203 are removed is obtained.

After the post-masking processing image is obtained in step S204 or S205, the feature amount acquirer 14 extracts a feature vector of the obtained post-masking processing image in the afore-described manner (step S206).

The feature amount acquirer 14 stores a feature vector obtained by concatenating a CAM-masked feature vector stored in the storage 20 and the feature vector extracted in step S206 in the current loop in the storage 20 as a new CAM-masked feature vector and thereby updates the CAM-masked feature vector (step S207). Note that, since, at the time of first execution of the afore-described class-dependent loop (the loop from step S203 to step S208), no CAM-masked feature vector has been stored in the storage 20, the feature vector extracted in step S206 is stored as it is in the storage 20 as a CAM-masked feature vector.

Next, the controller 10 determines whether or not the processing in the above-described class-dependent loop has been performed with respect to the activation maps of all the classes acquired in step S202 (step S208). When an activation map that has not been processed exists (step S208; No), the controller 10 returns to step S203 and performs the processing in the class-dependent loop, using the activation map of the next class. When the activation maps of all the classes have been processed (step S208; Yes), the controller 10 terminates the CAM-masked feature vector generation processing.

For example, in FIG. 6, a process in which the feature amount acquirer 14 extracts a feature vector 231 of the post-masking processing image 221 of the benign class in the first class-dependent loop, the feature amount acquirer 14 extracts a feature vector 232 of the post-masking processing image 222 of the malignant class in the next class-dependent loop, and the feature vector 231 and the feature vector 232 are concatenated with each other and a CAM-masked feature vector 241 is thereby generated is illustrated.

Through the CAM-masked feature vector generation processing described above, a CAM-masked feature vector is generated from a to-be-masked image and stored in the storage 20.

As described above, in the feature amount acquisition processing (FIG. 4), a CAM-masked feature vector generated as described above is associated with a reference image as a vector for search, and the DB for search is thereby constructed (step S107).

In the feature amount acquisition processing (FIG. 4), a feature amount of an image that has been subjected to image processing in such a way that the feature amount of an image obtained by subjecting a low active region to the masking processing, based on an activation map, that is, the feature amount of a low activation level image region, is smaller than the feature amount of a high activation level image region is acquired. In other words, the feature amount acquisition processing enables a feature amount in which the feature of a high active image region is more significantly reflected to be acquired. Therefore, the feature amount acquisition device 100 is capable of acquiring a feature amount in which, instead of a degree of visual similarity simply representing the entire image, a degree of similarity of an image region the degree of influence of which on the determination of benignness/malignancy of an observation target is considered to be high is more intensely reflected and that is hence suitable for the similar image search.

Figure 7:
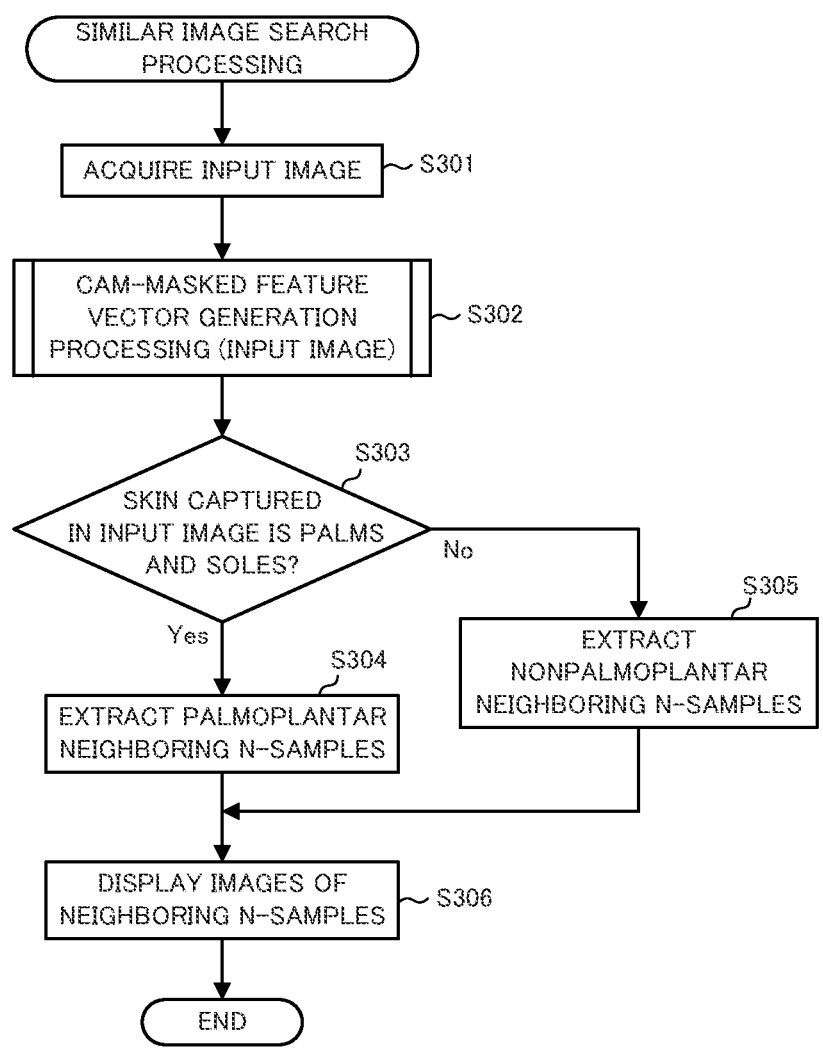
FIG. 7 is a flowchart of similar image search processing according to Embodiment 1.

Next, the similar image search processing in which the feature amount acquisition device 100 searches for an image similar to a provided input image is described below with reference to FIG. 7. The similar image search processing is started when the feature amount acquisition device 100 is instructed to start the similar image search processing by the user via the operation inputter 34. Note, however, that the above-described feature amount acquisition processing is required to be finished before the similar image search processing is started.

First, the controller 10 acquires an input image from the image inputter 31 (step S301). Next, the controller 10 subjects the acquired input image to the above-described CAM-masked feature vector generation processing (FIG. 5) (step S302) and generates a CAM-masked feature vector from the input image. Hereinafter, a CAM-masked feature vector generated from an input image is referred to as a search key vector.

Next, the controller 10 inputs the input image to the palmoplantar determination classifier and determines whether or not skin captured in the input image is the palms and soles (step S303). When the skin captured in the input image is the palms and soles (step S303; Yes), the searcher 15 extracts, based on the degrees of similarity between the search key vector and respective vectors for search stored in the DB for palmoplantar search, reference images each of which is associated with one of N (for example, 5) vectors for search selected in descending order of similarity to the search key vector, as neighboring N-samples (step S304).

When the skin captured in the input image is not the palms and soles (step S303; No), the searcher 15 extracts, based on the degrees of similarity between the search key vector and respective vectors for search stored in the DB for non-palmoplantar search, reference images each of which is associated with one of N (for example, 5) vectors for search selected in descending order of similarity to the search key vector, as neighboring N-sample similar images (step S305).

Note that, when a DB for search that does not discriminate the palms and soles from the non-palms and soles in the feature amount acquisition processing is constructed, the processing in step S303 may be omitted and the searcher 15 may, neglecting the palmoplantar labels, extract neighboring N-samples, based on the degrees of similarity between vectors for search associated with respective reference images and the search key vector. In addition, when, although a DB for search that does not discriminate the palms and soles from the non-palms and soles is constructed, the processing in step S303 is not omitted, the searcher 15 may, after sorting the reference images stored in the DB for search, based on the palmoplantar labels, extract neighboring N-samples, based on the degrees of similarity between the vectors for search associated with the respective reference images and the search key vector or may, neglecting the palmoplantar labels, extract neighboring N-samples, based on the degrees of similarity between the vectors for search associated with the respective reference images and the search key vector, in steps S304 and S305.

Figure 8:
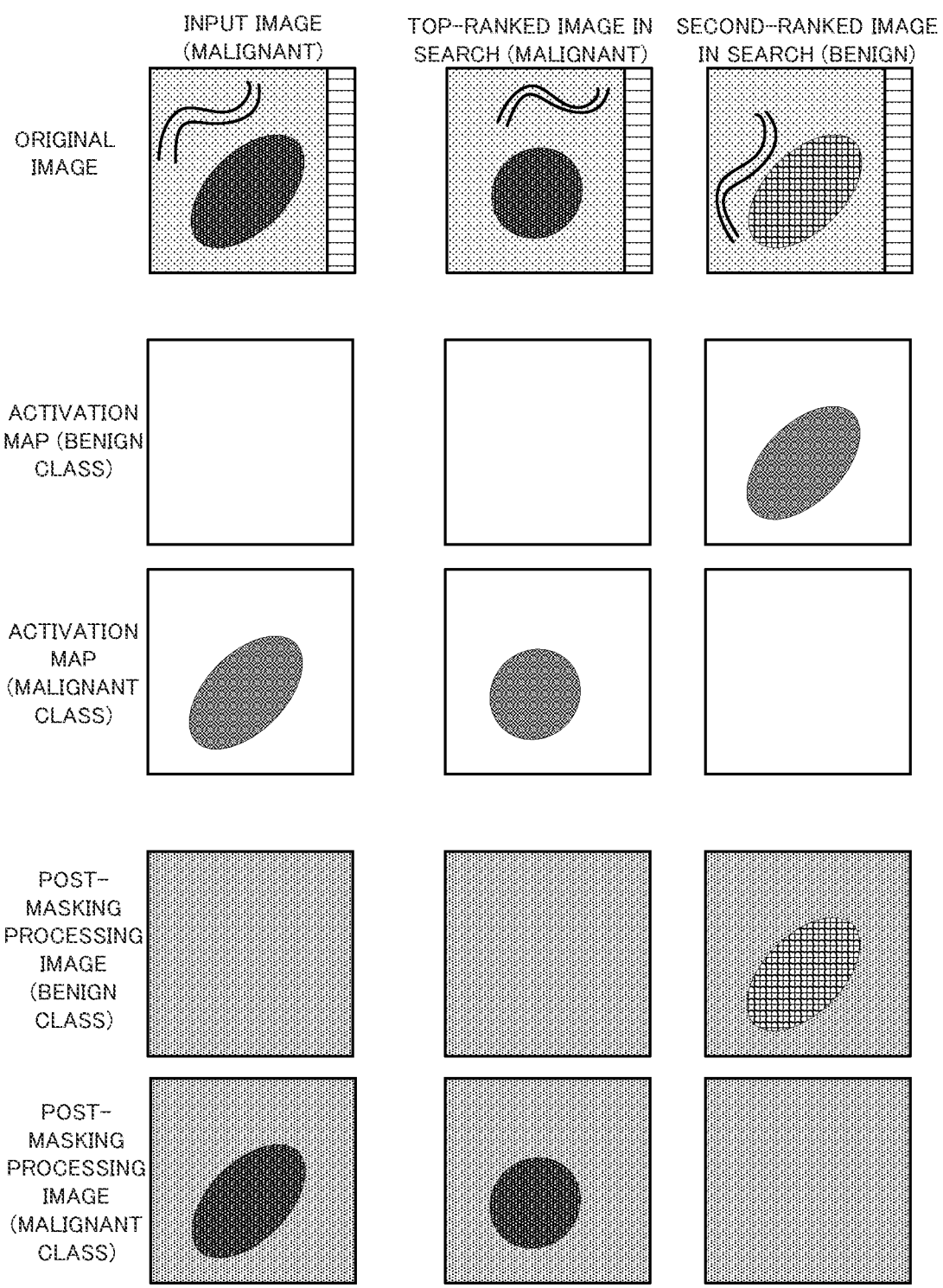

Next, the controller 10 displays the extracted neighboring N-sample similar images on the outputter 32 (step S306) and terminates the similar image search processing. In step S306, the controller 10 may display not only similar images found in the search but also activation maps generated from the input image and post-masking processing images, as illustrated in FIG. 8. Since a region in which the activation levels are high is, without being masked, reflected in the search key vector and a similar image is searched for based on the degrees of similarity between the search key vector and vectors for search, performing display as described above enables information such as which region in the image provided information about the region that was emphasized in the similar image search and led to a search result associating the similar image with the input image to be provided. In step S306, the controller 10 functions as display control means.

The similar image search processing was described above. In the above-described similar image search processing (FIG. 7), the similar image search that emphasizes an image region important for classification (categorization), based on activation levels in activation maps can be performed. Therefore, an image that is similar to the input image with respect to not only the degree of visual similarity but also information used for the classification (for example, benignness/malignancy) comes to be found in a search as a similar image.

In addition, in the above-described feature amount acquisition processing (FIG. 4), since, at the time of the masking processing, the image processing is performed by the alpha blending using an α value based on an activation level, the feature amount acquisition device 100 is capable of acquiring a feature amount that is calculated in such a manner that the higher the activation levels in an image region are, the more emphasis is put on the feature of the region, which cannot be acquired by simple binary masking processing.

In addition, since the image processing at the time of performing masking is differentiated depending on whether or not a second target (skin) is a specific target (the palms and soles), the feature amount acquisition device 100 is capable of acquiring a feature amount that is calculated by utilizing characteristics of the specific target (the palms and soles). Conversely, since, when the second target is not the specific target, it is considered that there is a high possibility that an object (such as a scale and a hair) that is considered as noise and has no relation to the search exists in the low active region, acquiring a feature amount with the entire low active region masked enables influence of such an object considered as noise to be reduced and precision of the similar image search to be improved.

In addition, when the second target (skin) is the specific target (the palms and soles), it is considered that information about an image region in which the activation levels are low (information about a fingerprint or the like) is also effective. That is, while, on the epidermis of the palms and soles, a characteristic shape in which epidermal depressions and epidermal ridges are formed in parallel (like a fingerprint) exists, whether or not the shape of a skin tumor includes such a characteristic shape also differs depending on whether or not the skin tumor is on the palms and soles, and the diagnosis method of a skin tumor also differs thereon. Therefore, when the similar image search is performed with respect to an input image including a palmoplantar region, it is preferable that an image of a palmoplantar region be found in the search as a similar image. Thus, in this case, the feature amount acquisition device 100 sets the minimum value of the α value at the time of performing the image processing by the alpha blending to the criterion value greater than 0. Because of this configuration, the feature amount acquisition device 100 is capable of, by limiting the masking processing by the alpha blending to limited masking, obtaining a post-masking processing image in which a fingerprint or the like existing on the palms and soles remains and acquiring a feature amount in which influence of a fingerprint or the like is reflected. Therefore, a reference image including the palms and soles becomes likely to be found in a search, and it is possible to improve the precision of the similar image search.

In addition, the masking processing may be performed by, without being limited to the alpha blending, changing pixel values in a low activation level image region to a pixel value representing a second target (the pixel value may be a pixel value representing the second target in grayscale or, without being limited to a pixel value representing the second target, may be a pixel value representing white, black, or the like), and, by performing such masking processing, the feature amount acquisition device 100 is capable of acquiring a feature amount in which characteristics of a high active image region is reflected with a small computational cost.

In addition, by defining tissue of a living thing as a second target and a diseased part or a part suspected to be diseased of the tissue as a first target, the feature amount acquisition device 100 is capable of acquiring, even for an observation target that is difficult to diagnose only by the degree of visual similarity, a feature amount in which the benignness/malignancy of the observation target is more largely reflected.

Note that, since the feature amount acquisition device 100 is capable of searching for a similar image similar to an input image by the above-described similar image search processing, the feature amount acquisition device 100 also serves as a similar image search device. Conversely, when the feature amount acquisition device 100 is not used as a device to search for a similar image (when the feature amount acquisition device 100 is used as a device to only acquire a feature amount), since the feature amount acquisition device 100 is only required to acquire a feature amount (CAM-masked feature vector) by the above-described feature amount acquisition processing, the feature amount acquisition device 100 does not have to execute the above-described similar image search processing and the searcher 15 is unnecessary.

Variation 1

Although, in Embodiment 1 described above, the teacher label included the race label and, in the CAM-masked feature vector generation processing (FIG. 5), race was acquired in step S201, information about race does not have to be used. When the information about race is not used, the race label does not have to be provided to a reference image, and the processing in step S201 in the CAM-masked feature vector generation processing is also unnecessary. In this case, as a specific color used in the masking processing, the color of skin of a race primarily existing in the country where the similar image search device is used, for example, the yellow race in the case of Japan, is used.

Variation 2

Although, in Embodiment 1 described above, the teacher label included the palmoplantar label, the palmoplantar determination classifier was generated, and different methods of masking processing were used depending on whether or not a region captured in a reference image or an input image was the palms and soles, information about the palms and soles does not have to be used. When the information about the palms and soles is not used, the palmoplantar label does not have to be provided to a reference image, and the processing in step S102 is unnecessary in the feature amount acquisition processing (FIG. 4). Further, the processing in steps S203 and S204 in the CAM-masked feature vector generation processing (FIG. 5) and the processing in steps S303 and S304 in the similar image search processing (FIG. 7) are unnecessary, and, both processing is only required to be performed by considering a region captured in a reference image or an input image to be constantly the non-palms and soles.

Variation 3

Although, in Embodiment 1 described above, the image processor 13 performed the masking processing by the alpha blending, the masking processing is not limited to the alpha blending. For example, the image processor 13 may perform binary masking processing in which the value of the activation level of each pixel is compared with a masking criterion value (a value greater than 0.0 and less than 1.0, which is, for example, 0.5) and, when the value of the activation level is less than the masking criterion value, the pixel in a to-be-masked image is completely replaced with a specific color and, when the value of the activation level is greater than or equal to the masking criterion value, nothing is done (the making is not performed at all). In this case, the image processor 13 is to perform image processing of, by changing pixel values in a low activation level image region to a pixel value representing a second target (specific color), masking the low activation level image region.

In addition, the image processor 13 may combine the alpha blending and the binary masking processing in the masking processing. For example, the image processor 13 may compare the value of the activation level of each pixel with the masking criterion value and, when the value of the activation level is less than the masking criterion value, completely replace the pixel in the to-be-masked image with the specific color and, when the value of the activation level is greater than or equal to the masking criterion value, perform the masking processing by the alpha blending according to the value of the activation level. Conversely, the image processor 13 may perform masking processing in which the value of the activation level of each pixel is compared with the masking criterion value and, when the value of the activation level is less than the masking criterion value, the masking processing is performed by the alpha blending and, when the value of the activation level is greater than or equal to the masking criterion value, nothing is done (the making is not performed at all).

Variation 4

Although, in Embodiment 1 described above, the BoVW was used at the time of acquiring a feature amount of an image, the BoVW is only an example of a feature amount. The feature amount acquisition device can use not only the BoVW but also an arbitrary feature amount as a feature amount of an image. In addition, even in the case of using the BoVW, the feature amount acquisition device may correct a feature amount by, when a local feature at each position is caused to vote in dense SIFT, changing a weight of a vote, based on the magnitude of the activation level at the position. On this occasion, the activation level may be compared with a feature extraction criterion value (a value greater than 0.0 and less than 1.0, which is, for example, 0.5) and, when the activation level is less than the feature extraction criterion value, the weight may be set to 0 (that is, the feature is not extracted as a local feature), and, with respect to a palmoplantar region, the weight may be reduced (for example, the weight is multiplied by a reduction coefficient (for example, 0.5)).

That is, the feature amount acquirer 14 may acquire a feature amount of an image, using a BoVW that is modified in such a manner that the value of the activation level of each feature point (local feature amount) in the image is compared with the feature extraction criterion value and, when the value of the activation level is less than the feature extraction criterion value, the weight of a vote is set to 0 (or, when the region is the palms and soles, a corrected value obtained by multiplying the weight by a reduction coefficient). When the BoVW modified in such a manner is used, a feature vector equivalent to the feature vector of a post-masking processing image can be directly extracted from each image even when the image processor 13 does not perform the masking processing, and concatenating the extracted feature vectors enables a feature vector equivalent to a CAM-masked feature vector to be generated. In this case, the image processor 14 is to acquire, based on activation levels calculated by the activation level calculator 12 and the image data of an input image, a feature amount of the input image in such a way that the feature amount of a low activation level image region that is a region in the input image corresponding to second units having lower activation levels than first units is smaller than the feature amount of a high activation level image region that is a region in the input image corresponding to the first units.

Variation 5

In Embodiment 1 described above, a CAM-masked feature vector was generated by concatenating the feature vectors of post-masking processing images for the respective classes in the CAM-masked feature vector generation processing. However, the CAM-masked feature vector is not limited to such a CAM-masked feature vector. A vector obtained by further concatenating the feature vector of the original image before being masked may be used as a CAM-masked feature vector. Such a configuration enables similar image search in which the degree of visual similarity is more taken into consideration to be performed.

Variation 6

Although, in Embodiment 1 described above, activation maps were generated by the CAM, the generation method of an activation map is not limited to the CAM. When an activation map is generated, a method other than the CAM, such as gradient-weighted class activation mapping (Grad-CAM), Guided Grad-CAM, and Score-CAM, may be used.

Since the CAM generates an activation map from the feature map 116, which is an intermediate layer closest to the fully-connected layer of the CNN classifier 11, the CAM has an advantage that it is possible to acquire activation levels in the feature map 116 that influences classification most. Since, in the Grad-CAM, activation levels in feature maps in not only the intermediate layer closest to the fully-connected layer (global characteristics are indicated) but also an intermediate layer at a further preceding stage (local characteristics are indicated) can be acquired, the Grad-CAM has an advantage that it is possible to acquire activation levels calculated by also focusing on local characteristics. In addition, the Guided Grad-CAM has an advantage that it is possible to acquire an activation level of a local feature amount (an edge or the like) existing in an input image. Since the Score-CAM does not use a gradient, the Score-CAM has an advantage that it is possible to acquire an activation level as a value that contains little noise and is stabler. Therefore, it is possible to generate activation maps by a method considered to be more effective according to the purpose of the similar image search.

In addition, when the Guided Grad-CAM is used as the generation method of activation maps, the image processor 13 may generate a feature vector by, in place of masking a low active region with a specific color, using an activation map itself acquired by the Guided Grad-CAM as a post-masking processing image. This is because, although, in the Guided Grad-CAM, an image in which only a region in which activation levels are higher is extracted from an input image and that does not have any value in a region in which activation levels are lower is obtained as an activation map, this image can be said to be an image subjected to image processing in such a way that the feature amount of a low activation level image region becomes smaller than the feature amount of a high activation level image region.

Variation 7

Although, in Embodiment 1 described above, the description was made assuming that reference images and an input image were dermoscopy images, the first target was a diseased part or a part suspected to be diseased of skin, and the second target was skin, the assumption is only an example. In general, when it is assumed that the second target is tissue of a living thing and the first target is a diseased part or a part suspected to be diseased of the tissue, the feature amount acquisition device can be applied to general medical images. For example, it may be assumed that reference images and an input image are colposcopy images, the first target is a diseased part or a part suspected to be diseased of the endocervix, and the second target is the endocervix. Alternatively, it may be assumed that reference images and an input image are mammography images, the first target is a diseased part or a part suspected to be diseased of the breast, and the second target is the breast.

Further, images targeted by the feature amount acquisition device are not limited to medical images. In general, when it is assumed that, in an image in which an examination target is captured, the first target is the examination target and the second target is the surroundings of the examination target, the feature amount acquisition device can be applied to an arbitrary image for examination. For example, it may be assumed that reference images and an input image are images that captured structures, the first target is rust, a crack, or the like or a part suspected to have rust, a crack, or the like on a structure (hereinafter, referred to as "first examination target"), and the second target is the surroundings of the first examination target. Alternatively, it may be assumed that reference images and an input image are images that captured foods, the first target is a bruise, decay, or the like or a part suspected to have a bruise, decay, or the like of a food (hereinafter, referred to as "second examination target"), and the second target is the surroundings of the second examination target.

In addition, in Embodiment 1 and the variations described above, the description was made using the RGB color space as a color space representing colors in image data. However, the color space is not limited to the RGB color space. For example, the YUV color space or the Lab color space may be used.

Other Variations

In addition, although, in the embodiment and the variations described above, it was described that, by the controller 10 executing a program achieving a classifier based on the CNN, the controller 10 also functioned as the CNN classifier 11, the present disclosure is not limited thereto. The feature amount acquisition device 100 may include a device separate from the controller 10 (such as a graphics processing unit (GPU) and a dedicated integrated circuit (IC)) and achieve the functions of the CNN classifier 11 by the device.

In addition, Embodiment 1 and the variations described above can be appropriately combined with one another. For example, by combining Variation 1 and Variation 2, a feature amount acquisition device that uses neither information about race nor information about the palms and soles can be configured. Since, in the feature amount acquisition device, it is only required that only the benignness/malignancy label is provided as the teacher label, the feature amount acquisition device has an advantage that a construction cost of the DB for search is reduced. Since the capability of, even without using information about race and the palms and soles, extracting a feature amount from an image in which a low active region is masked remains unchanged, it is possible to search for a similar case, based on the degree of similarity that emphasizes a region considered to have a high degree of influence on the determination of benignness or malignancy of an observation target.

Note that the respective functions of the feature amount acquisition device 100 can also be implemented by a general computer, such as a personal computer (PC). Specifically, in the above-described embodiment, the description was made assuming that programs of the feature amount acquisition processing and the similar image search processing that the feature amount acquisition device 100 performs are stored in advance in the ROM in the storage 20. However, a computer capable of achieving the above-described respective functions may be configured by storing programs in a non-transitory computer-readable recording medium, such as a flexible disk, a compact disc read only memory (CD-ROM), a digital versatile disc (DVD), a magneto-optical disc (MO), a memory card, and a universal serial bus (USB) memory, and distributing the recording medium and reading and installing the programs in the computer.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2020-137310, filed on Aug. 17, 2020, the entire disclosure of which is incorporated by reference herein.

INDUSTRIAL APPLICABILITY

The present disclosure is applicable to a feature amount acquisition device, a similar image search device, a display device, a feature amount acquisition method, a similar image search method, a display method, and a program that are capable of acquiring a feature amount suitable for similar image search.

REFERENCE SIGNS LIST

10 Controller
11 CNN classifier
11a First CNN classifier
11b Second CNN classifier
12 Activation level calculator
13 Image processor
14 Feature amount acquirer
15 Searcher
20 Storage
31 Image inputter
32 Outputter
33 Communicator
34 Operation inputter
100 Feature amount acquisition device
111 Input image
112, 113, 114, 115, 116, 117 Feature map
118 Output
121, 123, 124, 125 Filter
122, 126 Window
127 Fully-connected connection
141, 211, 212 Activation map
200 To-be-masked image
201 Observation target
202 Scale
203 Hair
221, 222 Post-masking processing image 231, 232 Feature vector
241 CAM-masked feature vector

The invention claimed is:

1. A feature amount acquisition device comprising:
a processor configured to:
derive, as an activation level, a level at which, in a classifier including a plurality of layers and configured to, by processing input data based on image data of an input image in which a first target and a second target around the first target are captured in the plurality of layers, output a result of classifying the first target, a unit in a layer among the plurality of layers influences a classification result of the classifier; and
acquire, based on the derived activation level and the second target in the image data of the input image, a set of feature amount for different regions of the input image, wherein among the set of feature amount, a feature amount of a low activation level image region is smaller than a feature amount of a high activation level image region, the low activation level image region being a region in the input image corresponding to a second unit having the activation level lower than the activation level of a first unit serving as the unit, the high activation level image region being a region in the input image corresponding to the first unit, wherein a setting of the acquisition of the set of feature amount includes the derived activation level being set as a transparency parameter of an image processing in the acquisition and a color of the second target being set as a specific color of the image processing, and the setting increases an emphasis of the first target in the input image.

2. The feature amount acquisition device according to claim 1, wherein the processor is configured to:
acquire image data of a post-processing image by subjecting the image data of the input image to the image processing with the setting; and
acquire a feature amount of the post-processing image, based on the image data of the acquired post-processing image, wherein the feature amount of the post-processing image is among the acquired set of feature amount.

3. The feature amount acquisition device according to claim 2, wherein the image processing is a masking processing and the processor is configured to subject the input image to the image processing to calculate a weighted average of each pixel value in the image data of the input image and a pixel value for the specific color of the masking processing, based on the activation level.

4. The feature amount acquisition device according to claim 2, wherein the processor is configured to:
determine whether or not the second target is a specific target; and
differentiate the image processing to which the image data of the input image is subjected between when the second target is determined to be a specific target and when the second target is determined to be not a specific target.

5. The feature amount acquisition device according to claim 4,
wherein, when the second target is determined to be a specific target,
wherein, in a case in which the activation level is less than a criterion value, the processor is configured to determine an input pixel weight represented by the transparency parameter, the input pixel weight being a weight of a pixel value in the image data of the input image, based on the criterion value,
wherein, in a case in which the activation level is greater than or equal to the criterion value, the processor is configured to determine the input pixel weight based on a value of the activation level,
wherein, the processor is configured to determine, based on the determined input pixel weight, a masking weight that is a weight of a pixel value of the specific color for masking processing, and
wherein, the processor is configured to subject the input image to the image processing to calculate a weighted average of each pixel value in the image data of the input image and a pixel value for the masking processing, based on the determined input pixel weight and the determined masking weight, and
wherein, when the second target is determined to be not the specific target,
wherein, the processor is configured to determine, regardless of a value of the activation level, a value of the activation level as the input pixel weight and determines, as the masking weight, a value obtained by subtracting the determined input pixel weight from one, and
wherein, the processor is configured to subject the input image to image processing to calculate a weighted average of each pixel value in the image data of the input image and a pixel value for the masking processing, based on the determined input pixel weight and the determined masking weight.

6. The feature amount acquisition device according to claim 4,
wherein when the second target is determined to be a specific target, the processor is configured to acquire a post-masking processing low activation level image region by subjecting the low activation level image region to masking processing, and acquires the post-processing image by integrating the acquired post-masking processing low activation level image region and the input image with each other, and
wherein, when the second target is determined to be not a specific target, the processor is configured to acquire a post-masking processing low activation level image region by subjecting the low activation level image region to masking processing, and acquires the post-processing image by integrating the acquired post-masking processing low activation level image region and a region other than the low activation level image region within the input image with each other.

7. The feature amount acquisition device according to claim 4, wherein the specific target is palms and soles.

8. The feature amount acquisition device according to claim 2, wherein the image processing comprises changing each pixel value in the low activation level image region to a pixel value representing the second target by subjecting the input image to the image processing to reduce a feature amount of the low activation level image region.

9. A display device, comprising:
a display to display a similar image found in a search by a similar image search device comprising:
the feature amount acquisition device according to claim 2,
wherein the processor is configured to search a plurality of reference images for the similar image similar to the input image, based on the acquired feature amount, wherein the display further displays at least one of an activation map visualizing the activation level and the post-processing image.

10. The feature amount acquisition device according to claim 1,
wherein the second target is tissue of a living thing, and
wherein the first target is a diseased part or a part suspected to be diseased of the tissue.

11. A similar image search device, comprising:
the feature amount acquisition device according to claim 1,
wherein the processor is configured to search a plurality of reference images for a similar image similar to the input image, based on the acquired feature amount.

12. A feature amount acquisition method in a feature amount acquisition device comprising a processor, the feature amount acquisition method comprising:
deriving, by the processor, as an activation level, a level at which, in a classifier including a plurality of layers and configured to, by processing input data based on image data of an input image in which a first target and a second target around the first target are captured in the plurality of layers, output a result of classifying the first target, a unit in a layer among the plurality of layers influences a classification result of the classifier; and
acquiring, by the processor, based on the derived activation level and the second target in the image data of the input image, a set of feature amount of different regions of the input image, wherein among the set of feature amount, a feature amount of a low activation level image region is smaller than a feature amount of a high activation level image region, the low activation level image region being a region in the input image corresponding to a second unit having the activation level lower than the activation level of a first unit serving as the unit, the high activation level image region being a region in the input image corresponding to the first unit, wherein a setting of the acquisition of the set of feature amount includes the derived activation level being set as a transparency parameter of an image processing in the acquisition and a color of the second target being set as a specific color of the image processing, and the setting increases an emphasis of the first target in the input image.

13. A non-transitory computer-readable storage medium storing a program that causes a computer of a feature amount acquisition device to:
derive, as an activation level, a level at which, in a classifier including a plurality of layers and configured to, by processing input data based on image data of an input image in which a first target and a second target around the first target are captured in the plurality of layers, output a result of classifying the first target, a unit in a layer among the plurality of layers influences a classification result of the classifier; and
acquire, based on the derived activation level and the second target in the image data of the input image, a set of feature amount of different regions of the input image, wherein among the set of feature amount, a feature amount of a low activation level image region is smaller than a feature amount of a high activation level image region, the low activation level image region being a region in the input image corresponding to a second unit having the activation level lower than the activation level of a first unit serving as the unit, the high activation level image region being a region in the input image corresponding to the first unit, wherein a setting of the acquisition of the set of feature amount includes the derived activation level being set as a transparency parameter of an image processing in the acquisition and a color of the second target being set as a specific color of the image processing, and the setting increases an emphasis of the first target in the input image.

14. A similar image search method in a similar image search device comprising a processor, the similar image search method comprising:
deriving, by the processor, as an activation level, a level at which, in a classifier including a plurality of layers and configured to, by processing input data based on image data of an input image in which a first target and a second target around the first target are captured in the plurality of layers, output a result of classifying the first target, a unit in a layer among the plurality of layers influences a classification result of the classifier;
acquiring, by the processor, based on the derived activation level and the second target in the input image, image data of a post-processing image by subjecting the image data of the input image to image processing, wherein a feature amount of a low activation level image region is smaller than a feature amount of a high activation level image region, the low activation level image region being a region in the input image corresponding to a second unit serving as the unit having the activation level lower than the activation level of a first unit serving as the unit, the high activation level image region being a region in the input image corresponding to the first unit, wherein a setting of the image processing includes the derived activation level being set as a transparency parameter of the image processing and a color of the second target being set as a specific color of the image processing, and the setting increases an emphasis of the first target in the input image;
acquiring, by the processor, a feature amount of the post-processing image, based on image data of the acquired post-processing image; and
searching, by the processor, a plurality of reference images for a similar image similar to the input image, based on the acquired feature amount of the post-processing image.

15. A display method, comprising:
searching for a similar image by the similar image search method according to claim 14, by the processor; and
displaying, by the processor, at least one of an activation map visualizing the activation level and the post-processing image in conjunction with the similar image found in the searching.

16. A non-transitory computer-readable storage medium storing a program that causes a computer of a similar image search device to:
derive, as an activation level, a level at which, in a classifier including a plurality of layers and configured to, by processing input data based on image data of an input image in which a first target and a second target around the first target are captured in the plurality of layers, output a result of classifying the first target, a unit in a layer among the plurality of layers influences a classification result of the classifier; and
acquire, based on the derived activation level and the second target in the input image, image data of a post-processing image by subjecting the image data of the input image to image processing, wherein a feature amount of a low activation level image region is smaller than a feature amount of a high activation level image region, the low activation level image region being a region in the input image corresponding to a second unit serving as the unit having the activation level lower than the activation level of a first unit serving as the unit, the high activation level image region being a region in the input image corresponding to the first unit, wherein a setting of the image processing includes the derived activation level being set as a transparency parameter of the image processing and a color of the second target being set as a specific color of the image processing, and the setting increases an emphasis of the first target in the input image;

acquire a feature amount of the post-processing image, based on image data of the acquired post-processing image; and search a plurality of reference images for a similar image similar to the input image, based on the acquired feature amount of the post-processing image.

17. A non-transitory computer readable storage medium storing a program that causes a computer of a display device to:

search for a similar image by causing the program according to claim 16 to be executed; and display at least one of an activation map visualizing the activation level and the post-processing image in conjunction with the similar image found in the searching.

* * * * *